(12) United States Patent
Chai

(10) Patent No.: US 7,499,965 B1
(45) Date of Patent: Mar. 3, 2009

(54) SOFTWARE AGENT FOR LOCATING AND ANALYZING VIRTUAL COMMUNITIES ON THE WORLD WIDE WEB

(75) Inventor: Sun-Ki Chai, Honolulu, HI (US)

(73) Assignee: University of Hawai'i, Honolulu, HI (US)

( * ) Notice: Subject to any disclaimer, the term of this patent is extended or adjusted under 35 U.S.C. 154(b) by 703 days.

(21) Appl. No.: 11/068,241

(22) Filed: Feb. 24, 2005

Related U.S. Application Data

(63) Continuation of application No. 60/548,383, filed on Feb. 25, 2004.

(51) Int. Cl.
*G06F 15/16* (2006.01)

(52) U.S. Cl. ............ 709/202; 709/203; 709/219; 709/226; 709/229

(58) Field of Classification Search ......... 709/202–203, 709/219, 226, 229
See application file for complete search history.

(56) References Cited

U.S. PATENT DOCUMENTS

| | | | |
|---|---|---|---|
| 6,513,060 B1 * | 1/2003 | Nixon et al. ............ | 709/203 |
| 6,785,717 B1 * | 8/2004 | Nickerson et al. ........ | 709/219 |
| 6,920,495 B1 * | 7/2005 | Fuselier et al. .......... | 709/219 |
| 7,085,820 B1 * | 8/2006 | Nickerson et al. ........ | 709/219 |
| 7,266,821 B2 * | 9/2007 | Polizzi et al. ........... | 709/202 |

OTHER PUBLICATIONS

"The Anatomy of a Large-Scale Hypertextual Web Search Engine", S. Brin, L. Page, Computer Networks and ISDN Systems, 1998, Elsevier Science B.V., pp. 107-117.
"Power and Centrality: A Family of Measures", Am J Sociology, vol. 92:5, Mar. 1987, U Chicago Press, pp. 1170-1182.

* cited by examiner

*Primary Examiner*—Bharat N Barot
(74) *Attorney, Agent, or Firm*—Leighton K. Chong

(57) ABSTRACT

A software tool allows non-expert users to locate and analyze virtual communities on the World Wide Web. It employs a configurable crawling algorithm based on social science network theories and content analysis to automatically locate a virtual community of interest to the user, identify key sites within the community, and determine content patterns that characterize the communications of key sites. The software tool employs crawling at an Intrasite Level, for searching for links from seed websites to other linked websites, and crawling at an Intersite Level, for determining which websites are to be included in a virtual community by degree of centrality and content similarity (based on keyword matching). The website data obtained by crawling are converted by network analysis, content analysis, and public analysis (of data obtained from public resources) into website characterizing data and saved in a standard file format to enable further research on virtual communities of websites.

7 Claims, 2 Drawing Sheets

(SPECIFY SEED SITES & CRAWLING PARAMETERS)

CRAWLING AT INTRASITE LEVEL:

SELECTING PARAMETERS FOR WEBSITES

SEARCH FOR LINKS AMONG WEBSITES

CRAWLING UNTIL MAXIMUM NUMBER REACHED

CRAWLING AT INTERSITE LEVEL:

RANKING CENTRALITY AMONG WEBSITES

DETERMINING CONTENT SIMILARITY

CRAWLING UNTIL SITES IN COMMUNITY FOUND (TO FIG. 2)

SOFTWARE AGENT FOR LOCATING AND ANALYZING VIRTUAL COMMUNITIES ON THE WORLD WIDE WEB

This U.S. patent application claims the priority of U.S. Provisional Application No. 60/548,383 filed on Feb. 25, 2004, of the same title, and by the same inventor.

TECHNICAL FIELD

This invention generally relates to a software tool that allows non-expert users to locate and analyze virtual communities on the World Wide Web.

BACKGROUND OF INVENTION

There is an existing and growing demand for automated software tools that can provide a simple, quick, and inexpensive way for users in business, government, and academia to collect information on the nature of virtual communities on the World Wide Web (or "Internet" generally) and the sites that make them up. Research about the Internet, and particularly the World Wide Web, is perhaps the fastest-growing empirical field of study in the social sciences, and is gaining great prominence in the government policy and business arenas as well. In particular, researchers are anxious to know more information about the characteristics of a community of sites relating to a particular topic, the relationships between sites in such a community, and the type of audience to which such sites appeal.

However, one notable thing about existing studies of the social structure of the Web is that few make any use of systematic quantitative or qualitative data, particularly data drawn from the Web itself. This shortage is not due to any lack of interest in systematic analysis within the academic, business, and government communities. Indeed, statistics, content analysis, and other systematic techniques are pervasive throughout each of the aforementioned professions. Nor is problem the inaccessibility of information from which such data could be generated, since one of the notable characteristic of the Web is the fact that much of the information on it is publicly accessible to anyone with an Internet connection. The real problem is the lack of a readily available means for extracting systematic data on virtual communities from available information, and putting in usable form.

The present inventor previously published a paper entitled, "Applying a New Empirical Technology to the World Wide Web", by Sun-Ki Chai, 97th Annual Meeting of the American Sociological Association, August 2002, Chicago, Ill. The paper noted the lack of automated software tools for systematic collection of data on Web community sites, and proposed the concept of using a "centrality algorithm" to collect quantitative information about sites of a Web community for statistical analyses. The centrality algorithm begins with an initial site or set of sites, as might be located through means of a Web directory or link page. As each site is downloaded, information is compiled on its links to outside sites contained within the site's web pages, as well as the size of its content. The software also compiles information on other sites that link to each site and the site's overall popularity, based on information available at various web search engines and mapping sites. The methodology then incrementally adds additional sites to the set, using a priority ranking algorithm based upon links in and links out to the existing set. Such an algorithm ensures that the incrementally growing set is highly cohesive as a network, and thus can appropriately be viewed as a virtual community. Once a suitable set of sites is downloaded, centrality measures within the community are calculated by application of link information, and are supplemented with data about the basic characteristics of each site, such as domain, age, and popularity.

"Centrality" concepts for locating important actors in social networks have originally been proposed in the sociological literature, and various versions of such concepts exist, although they have not been explicitly used to analyze sites on the internet or to identify virtual communities. A method of ranking linkages from related sites to a reference site, similar to centrality, has been used in the "PageRank" method developed by Sergey Brin and Lawrence Page for the well-known Google™ search engine for Internet searches. However, its implementation as a ranking algorithm for searches does not allow it to be used to identify virtual communities of interest to users.

There are also publicly available software for organizing Internet browsing such as: (1) the class of "site-rippers" that help users batch download large numbers of web pages onto their local drives for offline browsing; and (2) the class of "browser assistants" that provide supplementary information on browsed pages and/or help to index and label the browser cache. Neither type of software is really designed to provide systematic data on an entire virtual community, much less output this data in a form that can be used by other analytical software.

In summary, no software is known that has yet been provided to systematically gather and provide data on virtual communities on the Web. It would be desirable to provide a software agent capable of automatically crawling on the Web and locating virtual communities of interest to a user, and in particular, identifying key sites within the community, and determining the content patterns that characterize the communications of such key sites. It would further be desirable for the software agent to collect quantitative and qualitative data about the characteristics of sites in the community in a form that can be used by standard statistical, content analysis, and other data processing software.

SUMMARY OF INVENTION

In accordance with the present invention, a method for locating and analyzing a virtual community on the World Wide Web using a software agent for crawling among websites thereon, performs the following steps:

(1) Specifying one or more seed sites and parameters for crawling the seed sites and types of websites linked to them in order to find a virtual community of websites of interest.

(2) Crawling at an Intrasite Level (if site is defined as being at a level of analysis higher than a single page), performed by:
  (a) accepting the specified parameters for seed websites and types of websites to be crawled;
  (b) searching for links from seed websites to other linked websites; and
  (c) crawling the seed and linked websites for a specified Maximum Number of Pages, Maximum Number of Bytes, or Maximum Levels of Depth, and exiting the Intrasite Level of crawling when one or more of said specified numbers has been reached.

(3) Crawling at an Intersite Level, performed by:
  (a) ranking closeness between crawled websites within community and prospective centrality of uncrawled cites according to selected ranking criteria;
  (b) searching for keywords on the sites matching selected keyword criteria; and
  (c) crawling the websites until a Total Number of Sites has been found to qualify by centrality ranking and content matching as websites to be included in a Community, or until a Cutoff Point for Related Ranking has been reached according to the ranking criteria for centrality of websites, then terminating the Intersite Level crawling.

In determining which site to crawl next and add to the Community being analyzed, the crawler software uses a combination of link-based closeness ranking and content criteria. Link-based closeness is based on concepts close to the sociological construct of "network centrality", which describes the density and importance of links between an individual and other individuals within a face-to-face community. Network centrality identifies those individuals who occupy the key roles in a community, using as data information on their pattern of ties with other community members. This construct originally developed to characterize community of individuals in geographical space is used in the invention to assess intensity of connections between web-based sites within a virtual community and other members of the community, as well as closeness of sites being considered for inclusion as part of a community with sites already included within the community. The latter use in particular is a novel application of centrality-type measures.

Upon completion of initialization based on step (1), the crawler alternates between steps (2) and (3) until the crawl is completed, then a final step is performed to obtain and calculate additional data about sites forming a virtual community and render the data in a format that is readily analyzed further by importing into other data analysis software (e.g. statistical, mathematical, content analysis, and/or network).

In accordance with a further aspect of the present invention, a web-crawling data analysis method analyzes the links, websites, closeness rankings, and content matching data from websites in the above Intrasite and Intersite crawling, performing the following steps:

(1) Generating Network Data, including:
   (a) generating lists of websites crawled;
   (b) determining the degrees of centrality of the websites crawled to each other to identify those forming a coherent community according to selected centrality ranking criteria;
(2) Generating Content Data, including:
   (a) generating a frequency list of selected keywords found as matches on the websites;
   (b) generating a frequency list of selected keywords appearing only in page titles for the websites;
   (c) measuring sizes of the websites according to selected website criteria;
(3) Performing a Public Analysis of selected parameters of the websites obtained from public resources; and
(4) Saving the data generated in said analyses in a standard file format for further research of virtual communities on the World Wide Web.

The Public Analysis may consist of one or more of the following types:

(A) Generating Popularity Data, including
   (a) generating a visit count for each website by obtaining it automatically from public web resources;
   (b) generating a survey-reported user ranking for each website by obtaining it automatically from public web resources;
(B) Generating Geographical Data, including:
   (a) determining a geographical location for a registered domain name of each website from public domain name registries;
   (b) determining a geographical location for registering agent's address for each website from public domain name registries; and
   (C) Generating Age Data, by determining a date of registration for each website from public domain name registries and by examine timestamps on pages downloaded during the crawl.

Data may be saved in a set of ascii or comma-delimited-format data files. Most of the data is saved in a single csv-format file in which each site corresponds to a record that can easily be read and processed by common statistical software such as SPSS, SAS, and Microsoft Excel, as well as network analysis software such as UCINet. The deformatted text content of each site is saved in a file that can be used as a input to qualitative analysis software such as Nvivo or N6 for further processing. Lists of link-in and link-out URLs are saved in separate ascii files for each site. In addition, the program optionally saves copies of the sites themselves in an offline format that can be perused using a common web browser.

The software agent and method of the present invention thus uses a configurable crawling algorithm adapted from sociological "centrality" theory and content association to automatically locate virtual communities of interest around a particular topic specified by the user, identify key actors within the community, and determine the content patterns that characterize the communications of such key actors. It also draws upon the downloaded results of its crawls, as well as publicly available web information resources, to collect quantitative and qualitative data about the characteristics of sites in the community, and to output them in a form that can be used by standard statistical, content analysis, and other data processing software.

The novelty of the invention resides in its novel combination of components that can be used by researchers for a variety of applied studies of structure within virtual communities on the World Wide Web. It can be used primarily as a way for social scientists, business managers, government officials and other researchers and policy implementers to analyze the characteristics of the Web virtual community related to their topic of interest. It is a first application that potentially allows non-expert users to systematically identify the virtual community of websites concerned with a particular issue, and to single out those websites with the most influence within that community. It is also the first application that allows such users to automatically generate a wide range of link, content, geographical, age, and popularity data about websites without manually exploring the websites themselves as well as the various public references on the Internet relating to site characteristics.

Other objects, features, and advantages of the present invention will be explained in the following detailed description of the invention having reference to the appended drawings.

DETAILED DESCRIPTION OF INVENTION

Figure 1:
FIG. 1 illustrates a method for locating and analyzing a virtual community on the World Wide Web using a software agent for crawling among websites thereon, in accordance with the present invention.
Figure 1:

In the following detailed description of the present invention, a preferred embodiment of a software agent and Web-crawling method, and subsequent data analysis tools, are described with numerous specific details set forth in order to provide a thorough understanding of the present invention. However, it will be recognized by one skilled in the art that the present invention may be practiced without these specific details or with equivalents thereof. In other instances, well known methods, procedures, and components have not been described in detail as not to unnecessarily obscure aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system. In general, any type of general purpose, programmable computer system can be used by the present invention. A typical computer system has input and output data connection ports, an address/data bus for transferring data among components, a central processor coupled to the bus for processing program instructions and data, a random access memory for temporarily storing information and instructions for the central processor, a large-scale permanent data storage device such as a magnetic or optical disk drive, a display device for displaying information to the computer user, and one or more input devices such as a keyboard including alphanumeric and function keys for entering information and command selections to the central processor, and one or more peripheral devices such as a mouse. Such general purpose computer systems and their programming with software to perform desired computerized functions are well understood to those skilled in the art, and are not described in further detail herein.

In the present invention, a software agent and method provides a flexible, versatile tool that (1) automatically collects a wide variety of relevant quantitative and qualitative data about each of a specified set of websites on the World Wide Web, (2) puts the data in a form that can readily be used by standard statistical and content analysis software, (3) uses a crawling algorithm based upon social network theory and content analysis to intelligently expand a set of sites in order to locate a virtual community of interest surrounding a particular topic, and (4) analyzes and generates data about characteristics of the community as a whole.

Website Crawling & Data Gathering

Referring to FIG. 1, a method for locating and analyzing a virtual community on the World Wide Web using a software agent for crawling among websites thereon, performs the following steps:

(1) Specifying one or more seed sites and parameters for types of websites linked to them to be crawled in order to find a virtual community of websites of interest.

(2) Crawling at an Intrasite Level, performed by:
  (a) selecting parameters for seed websites and types of websites to be crawled, e.g., lists of extensions and/or mimetypes to exclude (html is never excluded), as well as whether to accept CGI-formatted URLs
  (b) searching for links from seed websites to other linked websites, e.g., searching non-html files, or the crawler can optionally look for URL links in text files and in media (e.g., ram, asx, m3u) files
  (c) crawling the seed and linked websites for a specified Maximum Number of Pages, Maximum Number of Bytes, or Maximum Levels of Depth, and exiting the Intrasite Level of crawling when one or more of said specified numbers has been reached; then (3) Crawling at an Intersite Level, performed by:
  (a) ranking degrees of closeness between crawled websites in a virtual community and candidate sites for inclusion in the community according to selected ranking criteria (see detailed explanation below)
  (b) searching for keywords on the websites matching selected keyword criteria; and
  (c) crawling the websites until a Total Number of Sites for a community has been found to qualify (coherence threshold or limit for a community being analyzed, then the crawl is terminated) by closeness ranking and keyword matching as websites to be included in a Community, or until a Cutoff Point for closeness Ranking and keyword matching (if no set outside current set meets cutoff, then the crawl is terminated) has been reached according to the ranking criteria for centrality of websites, then terminating the Intersite Level crawling.

For specifying seed sites and parameters for types of websites linked to them, one or more of the following options may be taken by the user:

(a) User provides one or more topic keyword(s) and/or set of one or more seed sites that define the nature of the virtual community of interest.
  (b) User specifies data attributes of virtual community and of sites within the community that are of interest
  (c) User provides information on the number of total sites belonging to the virtual community that he/she would like to identify and analyze
  (d) User specifies the level of analysis at which a site is defined (single page, subdirectory, host)
  (e) User optionally specifies parameters for intrasite and/or intersite crawling algorithms, or uses default values.

At the Intersite Level, the software agent and method uses measures of closeness, some of which draw upon social network theory. These include such concepts as:

(1) degree centrality, which measures the number of links between a node and other nodes in a network;

(2) between-ness centrality, which measures the number of geodesic paths between other nodes in a network on which a node is present;

(3) closeness centrality, which measures the total geodesic distance between a node and all other nodes in a network, and (4) eigenvector centrality.

The general concept of eigenvector centrality was proposed by the sociologist Phillip Bonacich, "Power and Centrality: A Family of Measures", *American Journal of Sociology*, Vol. 92 (5), pp. 1170-1182, published 1987. The sociological concept of eigenvalue centrality in turn is mathematically very similar to the "PageRank" algorithm used in the Google™ search engine. See Brin, Sergey, and Page, Lawrence, 1998, "The Anatomy of a Large-scale Hypertextual Web Search Engine", Computer Networks and ISDN Systems, Vol. 30, pp. 107-117.

In addition, candidate websites can be filtered out according to content criteria, such as the presence or absence of keywords pre-specified by the user to indicate content appropriate to the community. The software incrementally adds to the community of sites those outside websites with the highest centrality ranking vis-à-vis the community that also meets the keyword criteria.

User-Specified Website Definition

The software agent can be configured to crawl websites according to user specification of websites according to selection of the following parameters:

| (Choice of:) | Domain / Host / Directory / Page level |
|---|---|
| (Specify true / false:) | Normalize outside links to site level |

One important parameter determined by the user is to define the exact boundaries of websites. There is no consensus in the technical community about how to group together collections of pages on the Web into discrete sites. Link-analyzing search engine algorithms such as Google's PageRank and IBM's Clever Project traditionally ignore such issues by using pages as their unit of analysis. However, such an approach is typically less useful for applied social research, since many if not most useful hypotheses relating to the influence, popularity, and message of web sites typically apply to entire sites, not to individual pages.

Given the lack of consensus, users are given the option to define the nature of sites in different ways corresponding to different "levels" of a URL. For example, a site can be defined as:

(1) All pages under a particular domain, where domain corresponds to the concatenated domain "identifier", "type" and "country" of a URL (the latter two may not exist for some URLs). For instance, all pages under "yahoo.com" and "guardian.co.uk" would be defined as sites, regardless of prefix attached to these names.

(2) All pages under a particular host, e.g. "news.yahoo.com" or "sport.guardian.co.uk".

(3) All pages under a certain directory path, e.g. "sport.guardian.co.uk/cricket/".

(4) A single page.

For each choice, the user is given other options regarding what to do with links from an existing site that point outside the site and do not correspond to the "root" of another site, for example a link to "sport.guardian.co.uk/cricket/" when sites are defined at the host or domain level. The user can either have the crawler simply organize such links or to cut them to the appropriate level of analysis, i.e. transforming the above link to "sport.guardian.co.uk" or "guardian.co.uk" respectively.

Crawling and Filtering Criteria

As mentioned, the crawling algorithm begins with a set of "seed sites" that are used as the basis for developing the virtual community. These seed sites consist of anywhere from a single to numerous URLs. The crawling algorithm operates by enlarging the set of seed sites, adding additional sites, using various measures of relatedness to the sites.

Once the seed sites and crawling parameters have been specified by the user in step (1), the crawler alternates between Intrasite crawling step (2) and Intersite crawling step (3) until the crawl is completed, then a final step is performed to obtain and calculate additional data about websites forming a grouping that can be identified as a virtual community of websites, and render the data in a format that is readily analyzed further by importing into other data analysis software (e.g. statistical, mathematical, content analysis, and/or network).

One of the features of the software is that it allows for a variety of different algorithms to be used to direct crawling and expansion of the virtual community being examined. The alternatives available include novel features for directed crawlers. These include (1) the use of a "hypothetical" centrality to allow the smooth incorporation of different centrality algorithms from sociological social network theory into the program for such ranking and (2) the use of a composite measure that is a product of "links-in" and "links-out" centrality to rank the closeness of a candidate for inclusion into the virtual community being built.

For instance, suppose the user chooses a centrality measure function c for ranking candidate sites for addition into a virtual community set that is being identified by the software. Social network theory centrality measures are typically functions of: node x and a set of nodes $\Omega$ such that $x \in \Omega$, and depend on a matrix of relations r, where for all nodes x,y, $r_{x,y}=1$ if a relationship exists between nodes x and y and $r_{x,y}=0$ if no relation exists.

However, in order to rank candidate sites for addition into a virtual community set, a program must consider inclusion of prospective site s to set of nodes $\Psi$, where $s \notin \Psi$. The software addresses this issue by using the following adjustment to the approach. For chosen centrality measure c, the suitability of each site s for addition to virtual community set $\Psi$ is $c(s, \Psi \cup \{s\})$.

Hence for each candidate site, centrality is measured over a different set of sites, based upon the hypothetical community that would be formed if the site was added. Traditional centrality measures are typically based upon non-directional relationships. That is, if node x has a relationship with node y, then the node y also by definition has a relationship with node x, i.e. $r_{x,y}$ implies $r_{y,x}$, i.e. r is symmetric. However links on the web are directional, since one site can link to another without the second site linking to the first, and thus do not conform to the traditional definition of a "relationship" in social network theory.

There are various ways to deal with this kind of directionality. One is to simply focus on one kind of link and to define this as a "relationship". This is what in effect the Google PageRank algorithm does, though it does not explicitly acknowledge social network theories. Another is to view links in as defining a different kind of centrality than links out, and using these two different kinds of centrality in different ways, as with the IBM-based HITS algorithm.

This program typically adopts a different technique, using a composite centrality measures that is the product of the links in and links-out versions of whichever "base" centrality measure is chosen. For instance, suppose the chosen centrality measure is a normalized version of what is typically refereed to as degree centrality, i.e.

$$c(x,\Omega)=\Sigma_{t\in\Omega,\, t=s}(r(t,s)/\Sigma_{v\in\Omega,\, v=t}r(t,v)).$$

The composite centrality measure used in ranking the suitability of including site x into existing virtual community set $\Psi$ will then be $$b(x,\Psi\cup\{s\})=(\Sigma_{t\in\Psi}(q(t,s)/\Sigma_{v\in\Psi\cup\{s\}\{t\}}q(t,v)))*(\Sigma^{t\in\Psi}(q(s,t)/\Sigma_{v\in\Psi\cup\{s\}/\{t\}}q(v,t))),$$

where q is an asymmetric function indicating the existence of a link from the first argument to the second.

Another novel feature of the crawling algorithm is the optional use of a combination of centrality measures and content similarity (keyword matching) to rank overall suitability for inclusion of a candidate site in a virtual community. By default, content similarity based on keyword matching is determined by the following algorithm: Let $f(w,\Omega)$ be the frequency of the word w in the set of sites $\Omega$, measured as $\Sigma_{s\in\Omega}e(w,s)$, where $e(w,s)=1$ if word w appears anywhere in the site. Then the content similarity of the site s to those in virtual community set $\Psi$ will be $$d(s,\Psi)=\Sigma_w(e(w,s)-f(w,\Omega))^2.$$

If this feature is selected, then the overall measure of suitability for site s will be $$b(x,\Psi\cup\{s\})*d(s,\Psi).$$

Website Data Analysis

Figure 2:
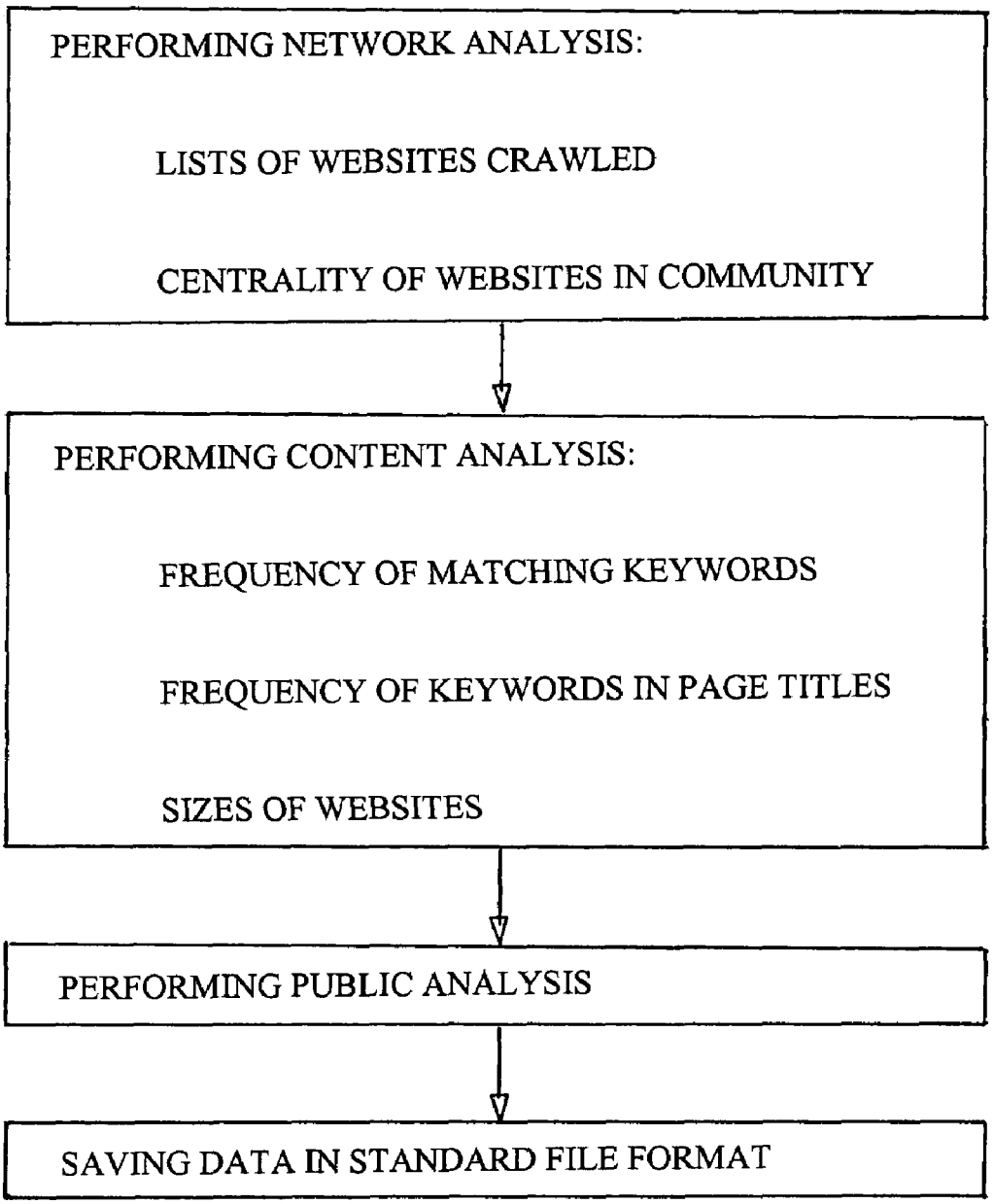
FIG. 2 illustrates a method for analyzing the links, websites, centrality rankings, and keyword matching data obtained from crawled websites and saving the data generated therefrom in a standard file format.

Referring to FIG. 2, the present invention includes the method of analyzing the links, websites, centrality rankings, and keyword matching data obtained from websites in the above Intrasite and Intersite crawling, by performing the following steps:

(1) Performing a Network Analysis, including:
  (a) generating lists of websites crawled;
  (b) determining the degrees of centrality of the websites crawled to each other to identify those forming a coherent community according to selected centrality ranking criteria;
(2) Performing a Content Analysis, including:
  (a) generating a frequency list of selected keywords found as matches on the websites;
  (b) generating a frequency list of selected keywords appearing only in page titles for the websites;
  (c) measuring sizes of the websites according to selected website criteria;
(3) Performing a Public Analysis of selected parameters of the websites obtained from public resources; and
(4) Saving the data generated in said analyses in a standard file format for further research of virtual communities on the World Wide Web.

The Public Analysis may consist of one or more of the following types:

(A) Popularity Analysis, including
  (a) generating a visit count for each website by obtaining it automatically from public web resources;
  (b) generating a survey-reported user ranking for each website by obtaining it automatically from public web resources;

(B) Geographical Analysis, including:
  (a) determining a geographical location for a registered domain name of each website from public domain name registries;
  (b) determining a geographical location for registering agent's address for each website from public domain name registries; and
(C) Age Analysis, by determining a date of registration for each website from public domain name registries.

Web Research Applications for Website Data

As mentioned, the software agent and Web-crawling method is meant to be extremely versatile, and can be used to address a variety of topics across different disciplines. Here are some examples of possible applications for the data that are generated by the program:

(1) Locating the virtual community of sites that focus on a particular topic area, and isolating the most influential sites within that community.

(2) Analyzing the determinants of a site's popularity within in terms of page views or survey results, using network, content, geographical, and age data as independent variables.

(3) Determining which types of sites are most likely to link to a known major resource site on a particular topic (by using it as a "seed" URL), and what interest groups these sites represent (by using frequency analysis on words found in these sites).

(4) Determining how closely sites representing two different interest groups are linked to one another (crawling over communities on two different topics), then examining overlap between the final results.

In addition to these types of analyses, which can be done directly by the crawler or through simple arithmetical manipulation of the crawlers' data output, a variety of more sophisticated analyses can be done by inputting the produced date into statistical or content analysis software, or into network analysis software such as UCINet.

The user parameters for the software agent can be specified by simple changes in the actual code of the software. Alternatively, a graphical user interface can be built to allow users with no training in computer programming to view and select user parameters for Web-crawling.

It is understood that many modifications and variations may be devised given the above description of the principles of the invention. It is intended that all such modifications and variations be considered as within the spirit and scope of this invention, as defined in the following claims.

The invention claimed is:

1. A method for locating and analyzing a virtual community on the World Wide Web using a software agent for crawling among websites thereon, comprising the steps of:
  (a) specifying one or more seed sites and parameters for types of websites linked to them to be crawled in order to find a virtual community of websites of interest;
  (b) crawling at an Intrasite Level, performed by:
    (i) selecting parameters for seed websites and types of websites to be crawled;
    (ii) searching for links from seed websites to other linked websites; and
    (iii) crawling the seed and linked websites for a specified Maximum Number of Pages, Maximum Number of Bytes, or Maximum Levels of Depth, and exiting the Intrasite Level of crawling when one or more of said specified numbers has been reached; then
  (c) crawling at an Intersite Level, performed by:
    (i) ranking degrees of centrality between crawled websites according to selected centrality ranking criteria;

(ii) searching for keywords on the websites matching selected keyword criteria; and (d) crawling the websites until a Total Number of Sites has been found to qualify by centrality ranking and content matching as websites to be included in a Community, or until a Cutoff Point for Related Ranking has been reached according to the ranking criteria for centrality of websites, then terminating the Intersite Level crawling.

2. A method according to claim 1, wherein a centrality measure function c is used for ranking candidate websites for inclusion in a Community based on nodes x and a set of nodes $\Omega$ such that $x \in \Omega$, ανδ a matrix of relations r, where for all website nodes x,y, $r_{x,y}=1$ if a relationship exists between nodes x and y and
$r_{x,y}=0$ if no relation exists, and wherein the chosen centrality measure is a normalized degree centrality:

$$c(x,\Omega)=\Sigma_{t\in\Omega,\, t=s}(r(t,s)/\Sigma_{v\in\Omega,\, v=t}r(t,v));$$

and a composite centrality measure is used in ranking the suitability of including website x into a virtual Community set $\Psi$:

$$b(x,\Psi\cup\{s\})=(\Sigma_{t\in\Psi}(q(t,s)/\Sigma_{v\in\Psi\cup\{s\}/\{t\}}q(t,v)))*(\Sigma_{t\in\Psi}(q(s,t)/\Sigma_{v\in\Psi\cup\{s\}/\{t\}}q(v,t)),$$

where q is a asymmetric function indicating the existence of a link from the first argument to the second.

3. A method according to claim 1, wherein content similarity for determining whether a website s is to be included in a virtual Community set $\Psi$ is based on a keyword matching algorithm: let $f(w,\Omega)$ be the frequency of the word w in the set of websites $\Omega$, measured as $\Sigma_{s\in\Omega}e(w,s)$, where $e(w,s)=1$ if word w appears anywhere in the website, then content similarity d based on keyword matching is determined by:

$$d(s,\Psi)=\Sigma_w(e(w,s)-f(w,\Omega))^2.$$

4. A method according to claim 1, wherein said specifying step consists of a user taking one or more of the following sub-steps:

(i) user provides one or more topic keyword(s) and/or set of one or more seed sites that define the nature of the virtual community of interest;

(ii) user specifies data attributes of a virtual community and of websites deemed to be within the community that are of interest;

(iii) user specifies a number of total sites belonging to the virtual community to be crawled for identification and analysis;

(iv) user specifies a level of analysis at which a site is to be crawled (single page, subdirectory, or host)

(v) user specifies parameters for Intrasite and/or Intersite crawling or default values for the same.

5. A method according to claim 1, further configured for analyzing links, websites, centrality rankings, and keyword matching data from websites obtained in the Intrasite and Intersite crawling, by performing the following steps:

(a) performing a Network Analysis, including:
(i) generating lists of websites crawled;
(ii) determining the degrees of centrality of the websites crawled to each other to identify those forming a coherent community according to selected centrality ranking criteria;

(b) performing a Content Analysis, including:
(i) generating a frequency list of selected keywords found as matches on the websites;
(ii) generating a frequency list of selected keywords appearing only in page titles for the websites;
(iii) measuring sizes of the websites according to selected website criteria;

(c) performing a Public Analysis of selected parameters of the websites obtained from public resources; and (d) saving the data generated in said analyses in a standard file format for further research of virtual communities on the World Wide Web.

6. A method according to claim 5 wherein said Public Analysis consists of one or more of the following types of analyses:

(a) Popularity Analysis, including
(i) generating a visit count for each website by obtaining it automatically from public web resources;
(ii) generating a survey-reported user ranking for each website by obtaining it automatically from public web resources;

(b) Geographical Analysis, including:
(i) determining a geographical location for a registered domain name of each website from public domain name registries;
(ii) determining a geographical location for registering agent's address for each website from public domain name registries; and (c) Age Analysis, by determining a date of registration for each website from public domain name registries.

7. A software agent operable as an executable program on a computer for locating and analyzing a virtual community of websites on the World Wide Web to which the computer has an online connection by performing the method according to claim 1.

* * * * *